(12) United States Patent
Reasor et al.

(10) Patent No.: US 7,730,040 B2
(45) Date of Patent: Jun. 1, 2010

(54) FEEDBACK-DRIVEN MALWARE DETECTOR

(75) Inventors: Sterling M Reasor, Bellevue, WA (US); Andrew J Newman, Kirkland, WA (US); Ronald A Franczyk, Kirkland, WA (US); Jason Garms, Woodinville, WA (US); Christopher Ryan Jones, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 11/190,749

(22) Filed: Jul. 27, 2005

(65) Prior Publication Data

US 2007/0038677 A1   Feb. 15, 2007

(51) Int. Cl.
G07F 17/30   (2006.01)
(52) U.S. Cl. .......................................... 707/690; 726/24
(58) Field of Classification Search ........................ None
See application file for complete search history.

(56) References Cited

U.S. PATENT DOCUMENTS

| | | | | |
|---|---|---|---|---|
| 5,931,935 | A * | 8/1999 | Cabrera et al. | 710/260 |
| 6,021,510 | A * | 2/2000 | Nachenberg | 714/38 |
| 6,263,345 | B1 * | 7/2001 | Farrar et al. | 707/104.1 |
| 6,647,400 | B1 * | 11/2003 | Moran | 707/205 |
| 7,069,316 | B1 * | 6/2006 | Gryaznov | 709/224 |
| 7,257,842 | B2 * | 8/2007 | Barton et al. | 726/24 |
| 7,340,774 | B2 * | 3/2008 | Hursey et al. | 726/22 |
| 7,620,995 | B2 * | 11/2009 | Verbowski et al. | 726/27 |
| 7,627,898 | B2 * | 12/2009 | Beck et al. | 726/23 |
| 2003/0074574 | A1 * | 4/2003 | Hursey et al. | 713/200 |
| 2003/0084322 | A1 * | 5/2003 | Schertz et al. | 713/200 |
| 2003/0110154 | A1 * | 6/2003 | Ishihara et al. | 707/1 |
| 2005/0155031 | A1 * | 7/2005 | Wang et al. | 717/170 |
| 2005/0187740 | A1 * | 8/2005 | Marinescu | 703/1 |
| 2005/0256805 | A1 * | 11/2005 | Satkunanathan et al. | 705/59 |
| 2005/0262160 | A1 * | 11/2005 | Grebenev | 707/201 |
| 2005/0268112 | A1 * | 12/2005 | Wang et al. | 713/188 |
| 2006/0031673 | A1 * | 2/2006 | Beck et al. | 713/164 |
| 2006/0074896 | A1 * | 4/2006 | Thomas et al. | 707/4 |
| 2006/0106838 | A1 * | 5/2006 | Ayediran et al. | 707/101 |
| 2006/0123244 | A1 * | 6/2006 | Gheorghescu et al. | 713/188 |
| 2006/0195529 | A1 * | 8/2006 | Braun et al. | 709/206 |
| 2006/0200814 | A1 * | 9/2006 | Kontinen et al. | 717/168 |

(Continued)

OTHER PUBLICATIONS

SoftActivity Active Monitor/Active Logger, [web page] http://www.softactivity.com, pp. 1-3, accessed Apr. 15, 2004.*

(Continued)

*Primary Examiner*—Neveen Abel Jalil
*Assistant Examiner*—Farhan M Syed
(74) *Attorney, Agent, or Firm*—Workman Nydegger (57) ABSTRACT

Embodiments of a feedback-driven malware detector are directed to protecting a computer from programs that perform actions that are malicious or not expected by a user. In one embodiment, the feedback-driven malware detector performs a method that initially determines whether the state of an application program scheduled to be added to an extensibility point on a computer is already known. If the state of the object is not already known, the user is informed that an application program is being installed on the computer and that the application program is being added to an extensibility point. Then, input is obtained from the user that assists in determining whether the application program is malware.

17 Claims, 4 Drawing Sheets

U.S. PATENT DOCUMENTS

| | | | |
|---|---|---|---|
| 2006/0236393 A1* | 10/2006 | Kramer et al. | 726/23 |
| 2006/0288416 A1* | 12/2006 | Costea et al. | 726/24 |
| 2007/0016914 A1* | 1/2007 | Yeap | 719/328 |
| 2007/0016952 A1* | 1/2007 | Stevens | 726/24 |
| 2007/0022287 A1* | 1/2007 | Beck et al. | 713/164 |
| 2007/0067630 A1* | 3/2007 | Lenkov et al. | 713/168 |
| 2007/0203884 A1* | 8/2007 | Nichols et al. | 707/2 |
| 2007/0226265 A1* | 9/2007 | Nichols et al. | 707/200 |

OTHER PUBLICATIONS

Wang, Yi-Min, et al., "Gatekeeper: Monitoring Auto-Start Extensibility Points (ASEPs) for Spyware Management," Nov. 14-19, 2004, 2004 LISA, pp. 33-46.*

* cited by examiner

FEEDBACK-DRIVEN MALWARE DETECTOR

BACKGROUND

The constant progress of communication systems that connect computers, particularly the explosion of the Internet and intranet networks, has resulted in the development of a new information era. With a single personal computer, a user may obtain a connection to the Internet and have direct access to a wide range of resources, including electronic business applications that provide a wide range of information and services. Solutions have been developed for rendering and accessing a huge number of resources. However, as more computers have become interconnected through various networks such as the Internet, abuse by malicious computer users has also increased. As a result, computer systems that identify potentially unwanted software have been developed to protect computers from the growing abuse that is occurring on modern networks.

It is estimated that four out of five users have unwanted software on their personal computers. Those skilled in the art and others will recognize that unwanted software may become resident on a computer using a number of techniques. For example, a computer connected to the Internet may be attacked so that a vulnerability on the computer is exploited and the unwanted software is delivered over the network as an information stream. These types of attacks come in many different forms including, but certainly not limited to, computer worms, denial of service attacks and the like, all of which exploit one or more computer system vulnerabilities for illegitimate purposes. Also, unwanted software may become resident on a computer using social engineering techniques. For example, a user may access a resource such as a Web site and download a program from the Web site to a local computer. While the program may be described on the Web site as providing a service desirable to the user; in actuality, the program may perform actions that are malicious or simply undesirable to the user. While those skilled in the art will recognize that unwanted software may take many different forms, for purposes of the present invention and for simplicity in description, all unwanted software will be generally referred to hereinafter as computer malware or, more simply, malware. As described herein, computer malware includes, but is certainly not limited to, spyware, ad ware, viruses, Trojans, worms, RootKit, or any other computer program that performs actions that are malicious or not desirable to the user.

When a malware becomes resident on a computer, the adverse results may be readably noticeable to the user—such as system devices being disabled; applications, file data, or firmware being erased or corrupted; the computer system crashing or being unable to perform normal operations. However, some malware performs actions that are covert and not readily noticeable to the user. For example, spyware typically monitors a user's computer habits, such as Internet browsing tendencies, and transmits potentially sensitive data to another location on the network. The potentially sensitive data may be used in a number of ways, such as identifying a commercial product that matches the observed tendencies of the user. Then the spyware may be used to display an advertisement to the user that promotes the identified commercial product. Since the advertisement interrupts the normal operation of the computer, the actions performed by the spyware may not be desirable to the user.

Many vendors have developed programs to identify and/or remove malware from a computer. Typically, a collection of signatures is developed that represents each piece of malware and then a computer is searched for objects (e.g., files, databases, etc.) that match these signatures. However, vendors who develop programs that identify and/or remove malware from a computer have been known to incorrectly identify a program as malware. In some instances, a program may be considered malware by one user and a beneficial program that performs desirable functions by another user. Moreover, under the present signature-based system, computers may be susceptible to malware in certain circumstances. For example, even when a user regularly installs software updates on a computer that provides the most recent malware signatures, there is a vulnerability window that exists between when a new computer malware is released on the network and when the new signature may be developed and installed to protect the computer from the malware. As the name suggests, it is during this vulnerability window that a computer system is vulnerable or exposed to the new computer malware.

SUMMARY

This summary is provided to introduce a selection of concepts in a simplified form that are further described below in the Detailed Description below. This summary is not intended to identify key features of the claimed subject matter, nor is it intended to be used as an aid in determining the scope of the claimed subject matter.

The foregoing problems discussed in the Background Section above are overcome by a feedback-driven malware detector, embodiments of which are directed to protecting a computer from application programs that perform actions that are malicious or not expected by a user. More specifically, in one embodiment, the feedback-driven malware detector performs a method that determines whether an application program that is scheduled to be added to an extensibility point on a computer is malware. The method initially determines whether the state of the application program with regard to containing malware is already known. If the state of the object is not already known, the user is informed that an application program is being installed on a computer and is being added to an extensibility point so that an object associated with the application program may execute without user input. For example, adding a file to an extensibility point may cause an application program to begin executing at computer "start up" and continue executing while the computer is on. However, if the user does not want the application program installed on the computer, the feedback-driven malware detector prevents the installation from continuing.

In another embodiment, the feedback-driven malware detector is implemented in a networking environment to aggregate user feedback generated at a plurality of client computers for purposes of determining whether an application program is malware. More specifically, the method collects data generated at client computers in a centralized location, such as a database associated with a trusted entity. The data collected includes an indicator or "vote" regarding whether a user allowed an application program to be installed on his or her computer. Moreover, the data collected may include, but is not limited to, one or more signatures of objects associated with an application program, file metadata, configuration information and the like. Then data collected from users is analyzed to determine whether an application program is malware. If the analysis indicates that the application program is malware, then objects that implement the application program are included on a "blacklist" of signatures that is distributed to protect computers in the networking environment from malware. The blacklist is used to determine whether an application program may be installed and/or executed on a computer.

BRIEF DESCRIPTION OF THE DRAWINGS

The foregoing aspects and many of the attendant advantages of the feedback-driven malware detector will become more readily appreciated as the same become better understood by reference to the following detailed description, when taken in conjunction with the accompanying drawings, wherein.

DETAILED DESCRIPTION

Embodiments of a feedback-driven malware detector described herein are directed to identifying an application program that performs actions that are malicious or not expected by a user. In this regard, when an application program is scheduled to be added to an extensibility point on a computer, the user is informed of the scheduled configuration change that will allow program code associated with the application program to be executed without input from the user. In one embodiment, a prompt is generated that seeks feedback regarding whether the installation and configuration changes that are scheduled to occur are expected by the user. Moreover, the user is given the option to prevent installation of the application program that is scheduled to be added to the extensibility point. The actions taken by the user provide an indicator or "vote" regarding whether the application program is malware. Then data generated at a computer associated with the user is transmitted to a computer associated with a trusted entity. Once a sufficient amount of data is received, the trusted entity may aggregate data received from a plurality of computers. By aggregating the data, the trusted entity can efficiently and quickly identify new malware that is propagating on a communication network without being required to reverse engineer the malware. As a result, instead of waiting days or weeks for a software update that is capable of identifying a new malware, the trusted entity is able to identify a new malware, with a very high degree of certainty, within a much shorter period of time.

The feedback-driven malware detector may be described in the general context of computer-executable instructions, such as program modules, being executed by a computer. Generally described, program modules include routines, programs, objects, components, data structures, and so forth, which perform particular tasks or implement particular abstract data types. Also, as described in further detail below, the feedback-driven malware detector may also be practiced in distributed computing environments where tasks are performed by remote processing devices that are linked through a communications network. In a distributed computing environment, program modules may be located in local and/or remote computer storage media.

While the feedback-driven malware detector will primarily be described in the context of determining whether an application program that is scheduled to be added to an extensibility point on a computer is malware, those skilled in the relevant art and others will recognize that aspects of the feedback-driven malware detector are also applicable to other areas than those described. In any event, the following description first provides an overview of an environment and system in which aspects of the feedback-driven malware detector may be implemented. Then methods that implement aspects of the feedback-driven malware detector are described. The illustrative examples provided herein are not intended to be exhaustive or to limit the claimed subject matter to the precise forms disclosed. Similarly, any steps described herein may be interchangeable with other steps or combinations of steps in order to achieve the same result.

Figure 1:
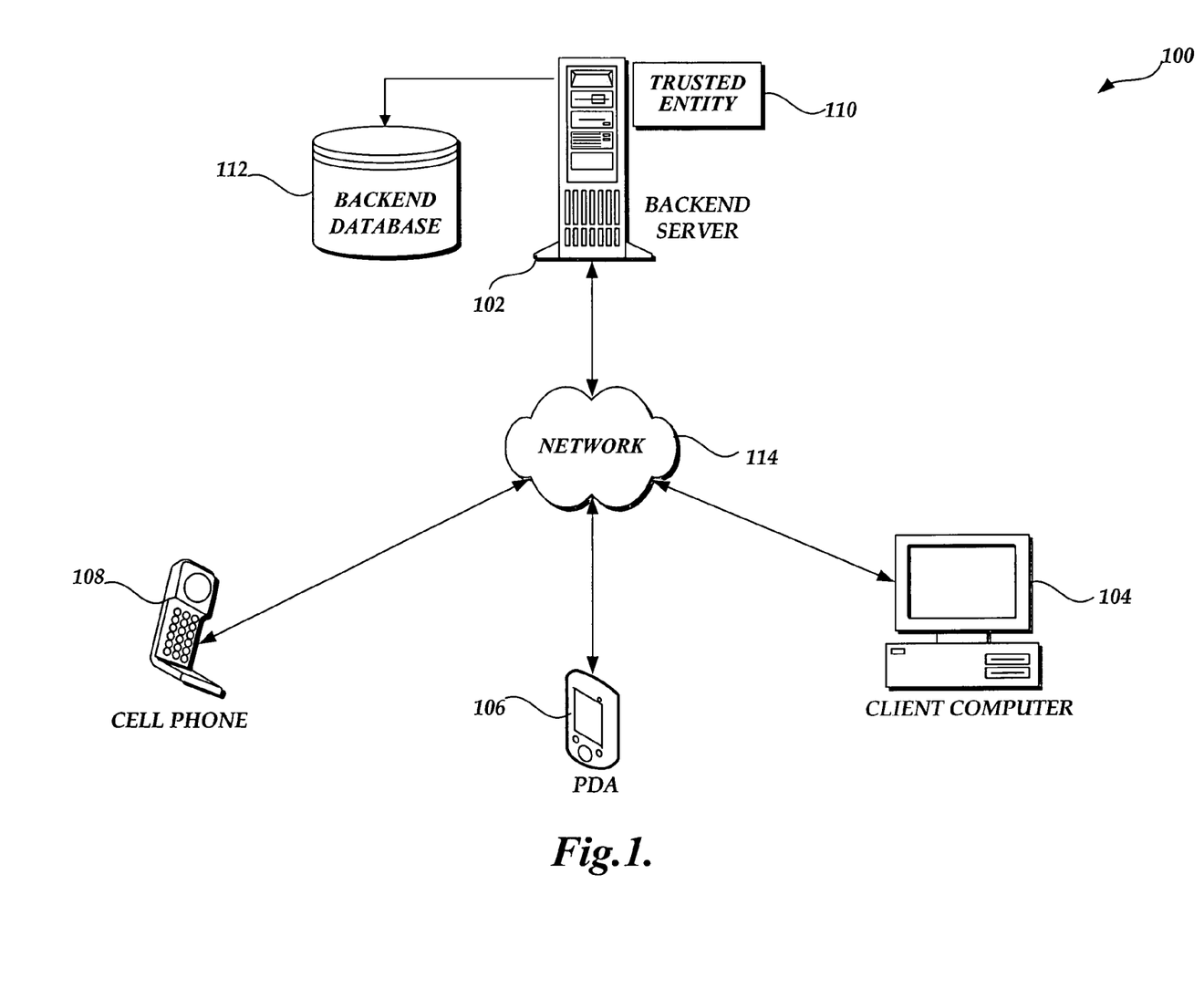
FIG. 1 is a pictorial depiction of a networking environment that includes a backend server and a plurality of client computers in which the feedback-driven malware detector may be implemented.

The following discussion is intended to provide a brief, general description of a networking environment 100 suitable to implement aspects of the feedback-driven malware detector. As illustrated in FIG. 1, the networking environment 100 is comprised of a plurality of computers—namely, the backend server 102, the client computer 104, the personal digital assistant ("PDA") 106, and the cell phone 108. The backend server 102 is shown associated with a trusted entity 110 and a backend database 112. Also, the backend server 102 is configured to communicate with the client computer 104, PDA 106, and the cell phone 108, via the network 114, which may be implemented as a Local Area Network ("LAN"), Wide Area Network ("WAN"), or the global network commonly known as the Internet. As known to those skilled in the art and others, the computers 102, 104, 106, and 108 illustrated in FIG. 1 may be configured to exchange files, commands, and other types of data over the network 114. However, since protocols for network communication such as TCP/IP are well known to those skilled in the art of computer networks, those protocols will not be described here.

For the sake of convenience, FIG. 1 illustrates a server computer, a client computer, a PDA, and a cell phone that are usable in the networking environment 100 in which complementary tasks may be performed by remote computers linked together through the communication network 114. However, those skilled in the art will appreciate that the feedback-driven malware detector may be practiced with many other computer system configurations. For example, the feedback-driven malware detector may be practiced with a personal computer operating in a stand-alone environment or with multiprocessor systems, minicomputers, mainframe computers, and the like. In this regard, the functions performed by the computers described herein, may be implemented by a plurality of computers. In addition to the conventional computer systems illustrated in FIG. 1, those skilled in the art and others will also recognize that the feedback-driven malware detector may be practiced on other kinds of computers, including laptop computers, tablet computers, or any device on which computer software or other digital content may be executed.

When software that performs the functions of the feedback-driven malware detector is implemented in one or more computers, the software provides a way to quickly and efficiently identify malware that is propagating on a communication network. Traditional malware detection techniques typically require a trusted entity to obtain a new malware sample "in the wild" and reverse-engineer program code that implements the malware. However, obtaining malware program code "in the wild," reverse-engineering the malware program code, and generating a signature for distribution to a plurality of computers takes a significant amount of time. In the meantime, the malware may continue to infect computers connected to the network. Given the speed at which data may be transmitted over modern networks, a malware may spread to a huge number of computers on the network before a signature that identifies the malware is available to protect the network-accessible computer. By contrast, the feedback-driven malware detector does not wait until program code that implements the malware can be obtained "in the wild." Instead, feedback obtained from users is leveraged to determine which application programs are malware.

In accordance with one embodiment, the feedback-driven malware detector monitors Auto-Start Extensibility Points ("ASEPs") on a computer associated with a user to determine whether an application program is malware. ASEPs refer to extensibility points that may be "hooked" to allow application programs to be auto-started without explicit user invocation. Embodiments of the feedback-driven malware detector monitor a plurality of ASEPs to identify objects that will be executed as a result of changes made to an ASEP. Generally described, an object that is added to an ASEP either automatically begins execution without user invocation (e.g., the WINDOWS EXPLORER® program in the MICROSOFT® WINDOWS operating system) or "hooks" into a program that is commonly executed by users (e.g., an internet Web browser program). ASEPs can be viewed in two ways—(1) as "hooks" (i.e., extensions) to existing auto-start application programs or (2) as standalone software applications that are registered as operating system auto-start extensions, such as an NT service in the MICROSOFT WINDOWS operating system, or as a daemon in UNIX-based operating system. Examples of known types of application programs that are commonly added to an ASEP include Browser Helper Objects ("BHOs") and Layered Service Providers ("LSPs").

In accordance with one embodiment, a computer associated with a user maintains "client-based" software that implements aspects of the feedback-driven malware detector. Conversely, a computer associated with the trusted entity maintains "server-based" software that implements additional aspects of the feedback-driven malware detector. In the context of FIG. 1, the client computer 104, the PDA 106, and the cell phone 108 execute the client-based software. In one embodiment, the client-based software is configured to compare signatures that are known to be associated with malware to a signature of an object that will automatically be executed without input from the user. If the signature generated from the object does not match a known signature, then the client-based software on a computer associated with a user generates a set of data that may be used by the trusted entity 110 to analyze the object for malware. For example, the user will typically be prompted for feedback regarding whether the installation of an application program is expected and whether the application program should be installed. In this way the user is alerted that an application program will execute automatically. The response and actions taken by the user is included in the set of data that is transmitted to a computer associated with the trusted entity 110 (e.g., the backend server 102) and stored in the backend database 112.

Collectively, the data in the backend database 112 allows the trusted entity 110 to aggregate events that occur on disparate computers connected to the network 114. As a result, developers may obtain different "views" of data to determine whether an application program is malware. For example, one "view" may be directed at identifying the number of users who allowed a specific application program to be installed on his or her computers. In this instance, if 99% of users did not allow an application program to be installed, a strong heuristic indicator exists that the application program is malware. Conversely, if a high percentage of users allow the application program to be installed, a strong heuristic indicator exists that the application program is benevolent.

As will be appreciated by those skilled in the art and others, FIG. 1 provides a simplified example of one networking environment 100 suitable for implementing embodiments of the feedback-driven malware detector. In other embodiments, the functions and features of the computing systems shown (e.g., the backend server 102, the client computer 104, the PDA 106, and the cell phone 108) may be implemented using a greater number of computing systems or reduced to a single computing system and thus not require network protocols for communication between combined systems.

Figure 2:
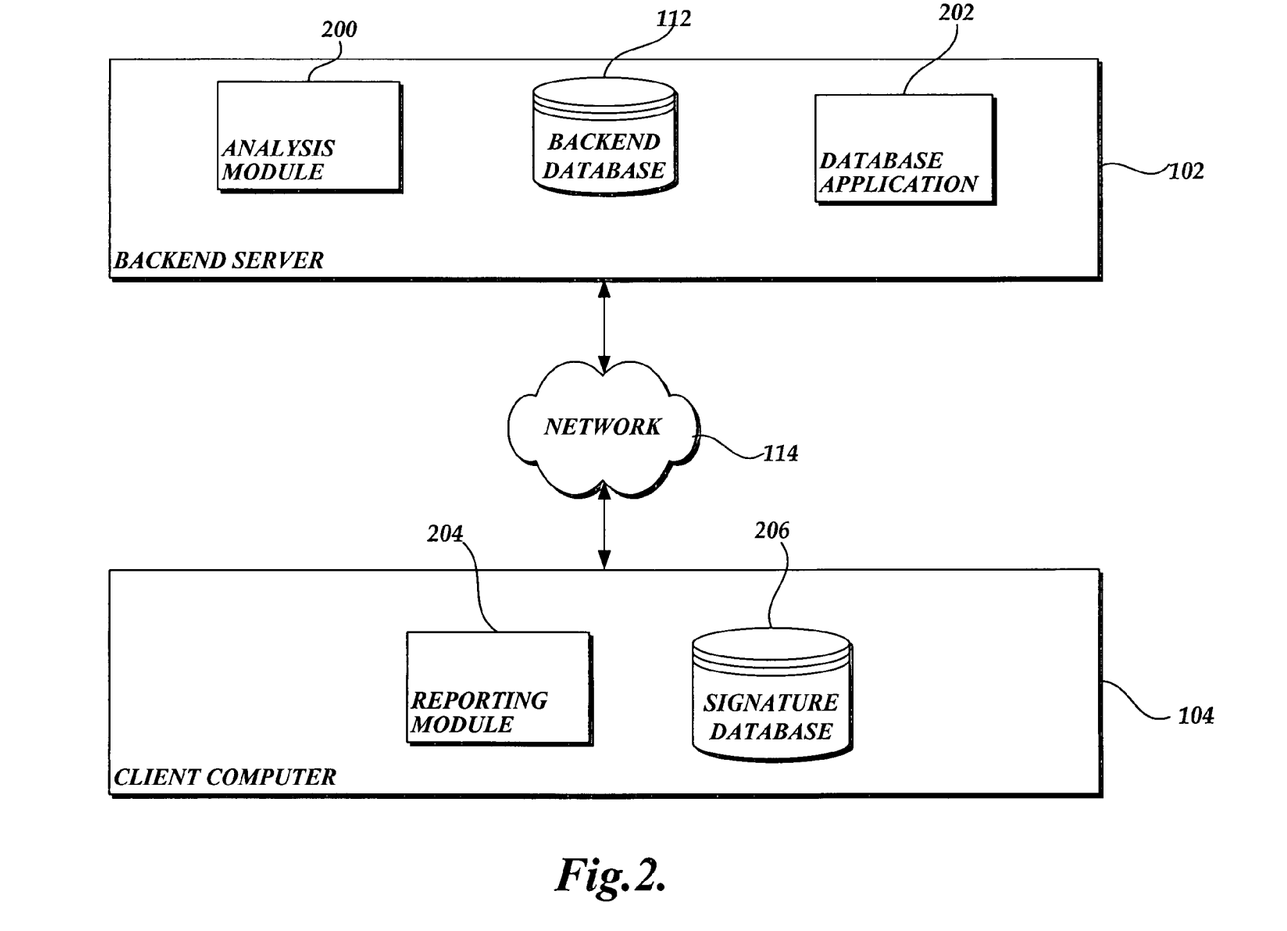
FIG. 2 is a block diagram of a backend server and client computer illustrated in FIG. 1 with software components that are configured to implement aspects of the feedback-driven malware detector.

FIG. 2 illustrates exemplary computer architectures for the backend server 102 and the client computer 104 depicted in FIG. 1. The exemplary computer architectures for the backend server 102 and the client computer 104 may be used to implement one or more embodiments of the feedback-driven malware detector. Of course, those skilled in the art will appreciate that the backend server 102 and the client computer 104 may include greater or fewer components than those shown in FIG. 2.

Now with reference to FIG. 2, components of the backend server 102 and the client computer 104 that are capable of implementing aspects of the feedback-driven malware detector will be described. For ease of illustration and because it is not important for an understanding of the claimed subject matter, FIG. 2 does not show the typical components of many computers, such as a CPU, keyboard, a mouse, a printer, or other I/O devices, a display, etc. However, as illustrated in FIG. 2, the backend server 102 does include an analysis module 200, the backend database 112 (FIG. 1), and a database application 202. Moreover, the client computer 104 includes a reporting module 204 and a signature database 206.

As illustrated in FIG. 2, the client computer 104 includes a reporting module 204 that contains software routines and logic implemented by the feedback-driven malware detector. Since functions and different embodiments of the reporting module 204 are described below with reference to FIG. 3, a detailed description of the module 204 will not be provided here. However, generally described, the module 204 monitors ASEPs on a computer associated with the user, waiting for an application program to attempt to add itself to an ASEP. When the ASEP monitoring functions of the reporting module 204 are triggered, a signature of the object that will execute as a result of the scheduled configuration modifications is created and compared to signatures that are on a "black list" generated from application programs that are known to be malware. Moreover the signature is compared to signatures on a "white list" generated from application programs that are known to be benevolent. In this regard, the client computer 104 includes a signature database 206 that contains signatures on both the "black list" and "white list." Those skilled in the art and others will recognize that the signature database 206 may be regularly updated using existing systems to include signatures that identify newly-discovered malware on benevolent applications.

In instances when a signature generated from the object does not match a signature maintained in the signature database 206, the reporting module 204 informs the user that an application program is being installed on the client computer 104 and that configuration changes are scheduled to be made so that the application program may begin executing without input from the user. Moreover, the reporting module 204 provides the user with an option to block installation of the application program. In instances when the user does not want the application program installed, the scheduled installation is prevented. Conversely, in instances when the user wants the application program installed, the scheduled installation proceeds without interference.

When a new signature is encountered that does not match a signature in the signature database 206, the reporting module 204 obtains a set of data from the client computer 104 that may be used by developers to determine whether the application program that is attempting to add itself to an ASEP is malware. In this regard, a set of data is generated by the reporting module 204 that is transmitted over the network 114 to the backend server 102 where the data is stored in the backend database 112.

As illustrated in FIG. 2, the backend server 102 includes an analysis module 200 that contains software routines and logic implemented by the feedback-driven malware detector. Since functions and different embodiments of the analysis module 200 are described below with reference to FIG. 4, a detailed description of the module 200 will not be provided here. However, generally described, the analysis module 200 is used to determine whether an application program that is attempting to add itself to an ASEP on a computer in a communication network is malware. As mentioned previously, the backend database 112 contains data obtained from a plurality of remote computers that includes an indicator regarding whether a user allowed a specific application program to be installed on his or her computer. The data stored in the backend database 112 may be aggregated into different "views" to assist developers in determining whether an application program is malware. In this regard, the backend server 102 includes a database application 202 that is configured to sort, arrange, or otherwise manipulate data in the backend database 112 to create the different "views." When the data in the backend database 112 is analyzed and an application program is identified as being malware, the analysis module 200 generates a signature that may be used to identify the malware. The signature may be distributed to users that opt-in to a service designed to protect computers from malware.

Those skilled in the art and others will recognize that the backend server 102 and the client computer 104 illustrated in FIG. 2 are highly simplified examples that only illustrate components that are necessary for an understanding of the claimed subject matter. In actual embodiments of the feedback-driven malware detector, the backend server 102 and the client computer 104 will have additional components that are not illustrated in FIG. 2. Thus, FIG. 2 illustrates only one example of computers capable of implementing aspects of the feedback-driven malware detector and is not intended to suggest any limitation as to the scope of use or functionality of the claimed subject matter.

Now with reference to FIG. 3, an exemplary embodiment of a reporting module 204 illustrated in FIG. 2 that causes data to be transmitted to a computer associated with a trusted entity in order to quickly and efficiently identify new malware will be described.

The reporting module 204 begins at block 300 where it remains idle and waits until an application program attempts to add itself to an ASEP on a computer. Those skilled in the art and others will recognize that the functionality of modern computer systems (e.g., operating systems, application programs, etc.) may be extended by other software systems. As mentioned previously, when the functionality of an operating system or application program is extended by other software systems, changes are made to the configuration of a computer so that an object such as a file is executed automatically without being invoked by the user. As a result, the application program may monitor the activities of the user or regularly perform actions that users find undesirable. Typically, modifications are made to one or more ASEPs when a software system is scheduled to be installed on a computer. Aspects of the feedback-driven malware detector monitor a plurality of ASEPs to identify instances when an object is scheduled to be executed automatically as a result of an application program being added to an ASEP on a computer.

Figure 3:
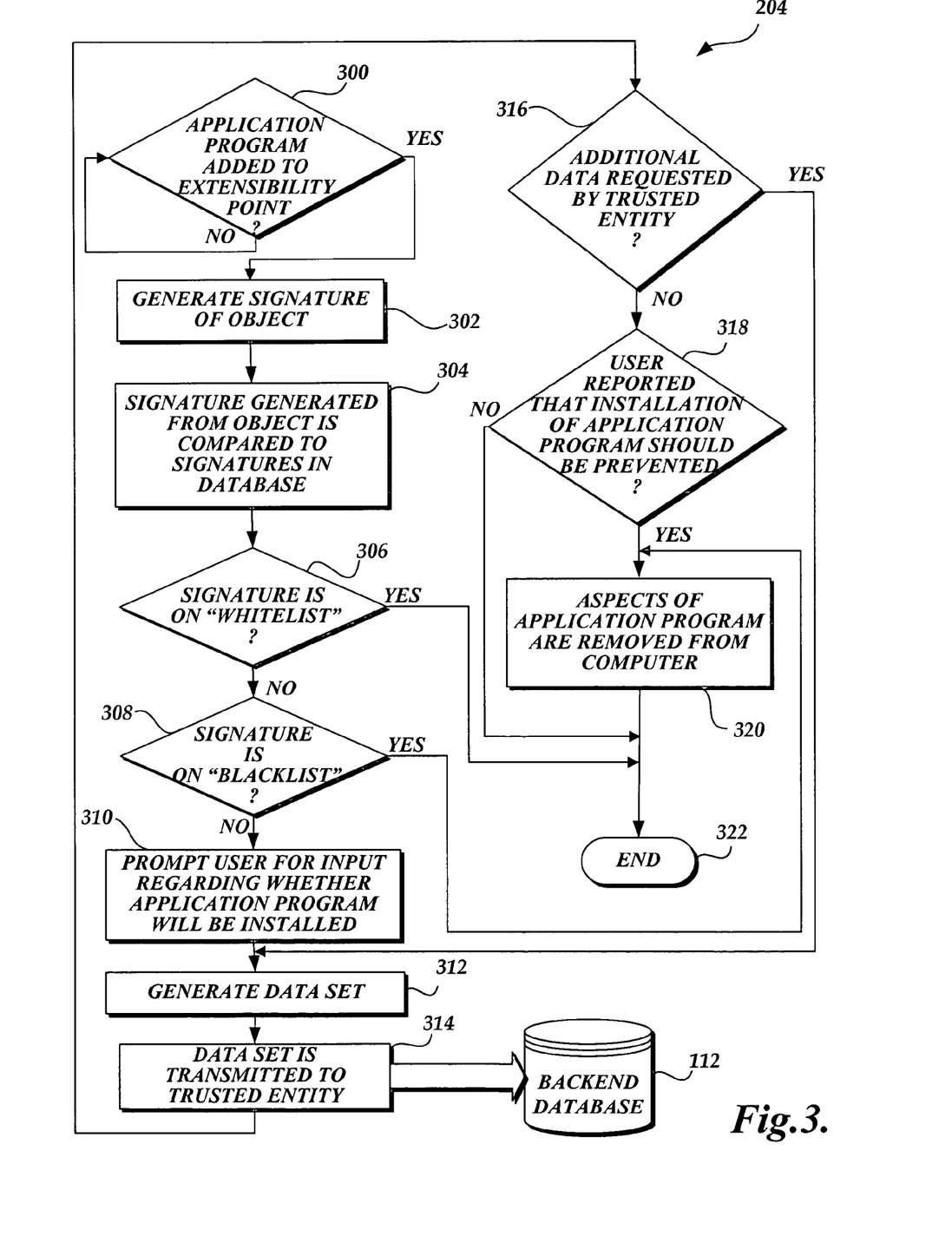
FIG. 3 is an exemplary flow diagram that depicts a reporting module which implements aspects of the feedback-driven malware detector when an application program is scheduled to be added to an extensibility point on a computer.

As illustrated in FIG. 3, at block 302, a signature of the object that was scheduled to be added to the ASEP on a computer is generated. For example, data in a file and/or data that describes attributes of a file—such as file metadata—is processed with a function that converts the data into a signature that uniquely identifies the file. In this example, a characteristic subset of a file may be identified and processed using the Message-Digest algorithm 5 ("MD5") hashing algorithm at block 302 to generate a signature.

Once the signature is generated, the reporting module 204 at block 304 searches a database for a matching signature. As mentioned previously, a computer that implements the reporting module 204 maintains a database (e.g., the signature database 206) that contains signatures on a "black list" that were generated from known malware and a "white list" that were generated from benevolent application programs. In any event, at block 304, a database is searched using techniques that are generally known in the art for a signature that matches the signature generated at block 302.

At decision block 306, the reporting module 204 determines whether the signature generated at block 302 is on the "white list" that contains signatures associated with benevolent application programs. If the signature generated a block 302 matches a signature on the "white list," the reporting module 204 proceeds to block 322 where terminates. Conversely, if the signature generated a block 302 does not match a signature on the "white list," the reporting module 204 proceeds to block 308.

At decision block 308, the reporting module 204 determines whether the signature generated at block 302 is on a "black list" that contains signatures of benevolent application programs. If the signature generated a block 302 matches a signature on the "black list," the reporting module 204 proceeds to block 316 described in further detail below. Conversely, if the signature generated a block 302 does not match a signature on the "black list," the reporting module 204 proceeds to block 310.

As illustrated in FIG. 3, at block 310, the user is informed that an application program is scheduled to be installed and that configuration changes will be made so that an object associated with the application program may begin executing without input from the user. If block 310 is reached, the signature generated at block 302 does not match a signature either on the "black list" or the "white list." In this instance, a set of data that describes the application program that is attempting to add itself to an ASEP on the computer will be transmitted to a computer associated with a trusted entity. However, in accordance with one aspect of the feedback-driven malware detector, the user is informed of the configuration changes that an application program is attempting to make to the user's computer. Moreover, the user is provided with the option of preventing the application program from being installed. In one embodiment, the user is presented with a "pop-up" window at block 310 that provides an option to the user regarding whether the scheduled installation should be allowed to proceed. Using graphical user interface elements on the pop-up window, the user may generate a command that will prevent the application program from being installed.

In accordance with one embodiment of the reporting module 204, the user is presented with data at block 310 that is designed to assist the user in deciding whether the application program should be installed. For example, as mentioned previously, aspects of the feedback-driven malware detector aggregate data received from a plurality of computers. The data obtained may indicate that a high percentage of users prevented an application program from being installed on their computers. By way of example only, data may be downloaded from a computer associated with a trusted entity (e.g., the backend server 102) and presented to the user in a chart or graph. In this way, a user may be presented with a visual display that illustrates the percentage of users who prevented the application program that is attempting to add itself to an ASEP on the user's computer from being installed. With this data, a user may make an informed decision, based on the actions taken by others, regarding whether the functions of the application program are characteristic of malware.

At block 312, the reporting module 214 generates a set of data from a computer associated with a user that will be transmitted to the trusted entity. The data collected is used to catalog application programs that are being installed on computers connected to a communication network. Moreover, as described in further detail below with reference to FIG. 4, the data collected allows the trusted entity to aggregate data from different computers in determining whether an application programs is malware. In this regard, the data collected includes, but is not limited to, the signature generated at block 302, file metadata, configuration data, and run-time attributes that identify the state of the computer.

At block 314, the dataset generated at block 312 is transmitted to a computer associated with the trusted entity. For example, data generated from a computer associated with a user (e.g., the client computer 104) may be transmitted over a network connection to the backend server 102 (FIG. 1) and stored in the backend database 112. However, since transmitting a set of data over a network connection for storage in a database may be performed using techniques that are generally known in the art, further description of these techniques will not be provided here.

At decision block 316, the reporting module 204 determines whether additional data was requested by the computer associated with the trusted entity. In one embodiment of the feedback-driven malware detector, a two-way channel of communication is opened between a computer associated with the user (e.g., the client computer 104) and a computer associated with the trusted entity (e.g., the backend server 102). Typically, the trusted entity will only collect a basic set of data when an application program attempts to add itself to an ASEP on a computer. However, in some instances, especially when a small amount of data has been previously collected about an application program, a computer associated with a trusted entity may request additional data from a computer associated with the user. For example, the trusted entity may want to analyze the actual program code that will be executed on the user's computer if the scheduled configuration changes are allowed. In this instance, the computer associated with the trusted entity may request and obtain the program code. In any event, if a computer associated with a trusted entity generates a command for additional data, the reporting module 204 proceeds back to block 312 where the command is satisfied. Conversely, if additional data is not requested, the reporting module proceeds to block 318.

As illustrated in FIG. 3, at decision block 318, the reporting module 204 determines whether the installation of the application program that attempts to add itself to an ASEP on the user's computer will be prevented. As mentioned previously, feedback is obtained (at block 310) from the user regarding whether installation of the application program should be prevented. If the user indicated that the application program should be installed, the reporting module 204 proceeds to block 322 where it terminates. Conversely, if the user indicated that the application program should not be installed, the module 214 proceeds to block 320.

At block 320, an existing software system removes aspects of an application program from the user's computer. Program code that implements an application program may consist of thousands of files. In order to allow an application program to execute without requiring input from the user, only a single configuration change needs to be made to a computer. However, all aspects of the application program (program code, data, configuration changes, etc.) will be removed from the computer if block 320 is reached. Those skilled in the art and others will recognize that software systems have been developed that distribute cleaning routines that are configured to remove all aspects of an application program from a user's computer. The feedback-driven malware detector may be implemented in conjunction with this type of software system to remove aspects of an application program from a user's computer. Then the reporting module 204 proceeds to block 322 where it terminates.

Now with reference to FIG. 4, an exemplary embodiment of an analysis module 204 illustrated in FIG. 4 that is used to determine whether an application program is malware will be described.

The analysis module 204 begins at block 400, where it remains idle until an analysis of the data received from remote computers is scheduled to be performed. As mentioned above with reference to FIG. 2, the analysis module 204 will typically be executed on a computer associated with a trusted entity (e.g., the backend server 102). In accordance with one embodiment, a trusted entity receives a set of data when an application program attempts to add itself to an ASEP on a computer associated with a user. As a preliminary matter, the data collected by the trusted entity may be used to prioritize which applications should be analyzed for malware by anti-malware developers. As mentioned previously, the analysis module 200 is implemented in conjunction with a database application (e.g., the database application 202) that is used to sort or otherwise manipulate data received from users. Using a database application, data that describes events occurring across a communication network such as the Internet may be aggregated for the purpose of prioritizing which application programs anti-malware developers will analyze for malware. For example, the database application 202 may sort data in the backend database 112 for the purpose of identifying those application programs that are being installed on the most computers connected to the Internet. In this instance, the anti-malware developers may determine that an analysis of an application program for malware should be performed based on the number of computers that are installing a particular application program.

Figure 4:
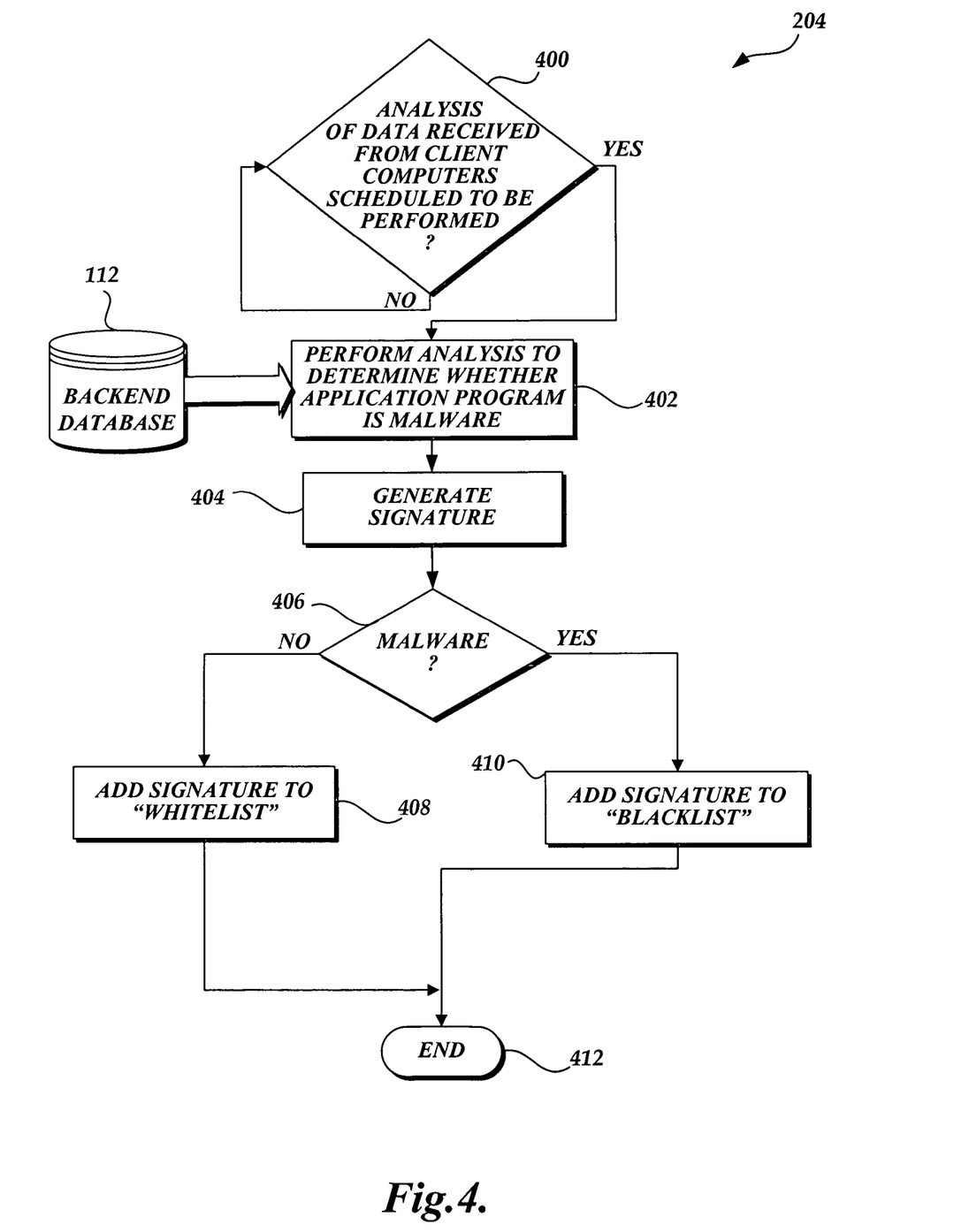
FIG. 4 is an exemplary flow diagram that depicts an analysis module which may be used to implement aspects of the feedback-driven malware detector in determining whether a file contains malware.

As illustrated in FIG. 4, at block 402, an analysis is performed to determine whether a specific application program implements malware. An experienced anti-malware software developer may determine that an application program is malware by analyzing data received by the trusted entity and stored in the backend database 112. In this regard, aspects of the feedback-driven malware detector assists anti-malware developers to quickly and accurately determine whether an application program implements malware without having to reverse engineer malware program code. A system that quickly identifies malware and distributes software updates that are capable of detecting the malware reduces the time period or "vulnerability window" in which computers may become infected. In any event, data stored in the backend database 112 may be aggregated into different "views" to assist developers to determine whether an application program is malware. In one view, data that describes the propensity of users to allow an application program to be installed on his or her computers is provided. As mentioned previously, this "view" provides a powerful heuristic indicator regarding whether an application program is malware.

As mentioned previously, the data collected by the trusted entity includes, but is not limited to signatures, metadata, configuration data, and run-time attributes that identify the state of a computer. Also, in one embodiment, the trusted entity stores program code in the backend database 112 that implements an application program. In this instance, developers may perform a very accurate analysis to determine whether an application program is malware, at block 402. For example, when the program code that implements an application program and runtime attributes is known, developers may cause the potential malware to be installed in a protected laboratory setting. Once installed, developers may directly witness the functions performed by an application program firsthand without relying only on data received from remote computers. However, while specific techniques and tools have been described for performing the analysis at block 402, those skilled in the art and others will recognize that the other analysis tools may be used to determine whether an application program is malware.

At block 404, a signature that may be used to identify the application program analyzed at block 402 is generated. As mentioned previously, a set of data associated with an application program may be processed using a hashing algorithm in order to generate a signature that uniquely identifies the application program. Typically, program code that implements an application program is processed with the hashing algorithm to generate a signature. However the analysis module 204 does not necessarily need program code that implements an application program to create a signature. For example, in one embodiment, the trusted entity receives meta and other configuration data from a computer associated with a user that describes attributes of an application program. In this instance, the signature is generated from data that was received, which does not necessarily include program code that implements an application program.

At decision block 406, the analysis module 200 determines whether the application program being analyzed is malware. As mentioned previously, an analysis that uses tools and data provided by aspects of the feedback-driven malware detection is performed at block 402 for the purpose of determining whether an application program is malware. If the analysis performed indicates that an application program is not malware, the analysis module 200 proceeds to block 410, described below. Conversely, if the analysis performed indicates that the application program is malware, the module 200 proceeds to block 408.

At block 408, the signature generated at block 404 is added to a "white list" that is used to catalog benevolent application programs. If block 408 is reached, the application program analyzed at block 402 was identified as being benevolent. Those skilled in the art and others will recognize that systems have been developed for distributing software updates to network-accessible computers. In the context of anti-malware applications, the software updates typically include signatures that may be used to identify benevolent application programs. As mentioned previously, signatures used to identify benevolent application programs are included on a "white list." At block 408, the signature generated at block 404 is added to the "white list" that will be distributed to network-accessible computers in a software update using techniques that are generally known on the art. Then the analysis module proceeds to block 412, where it terminates.

At block 410, the signature generated at block 404 is added to a "black list" that is used to catalog malware. If block 410 is reached, the application program analyzed at block 402 was identified as being malware. Similar to the description provided above at block 408, the signature generated at block 404 is added to a "black list" that is distributed to network-accessible computers. However, since adding a signature to a "blacklist" may be performed using techniques that are generally known in the art, further description of these techniques will not be provided here. Then the analysis module proceeds to block 412, where it terminates.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method to determine whether an application program contains malware, comprising:

employing a processor executing computer executable instructions stored on a computer readable storage medium to implement the following acts:

monitoring an extensibility point that allows the application program to execute without input from a user, the user being a participant in a malware prevention service that is configured to receive input from a plurality of different malware prevention service participants;

determining whether the application program is scheduled to be installed and added to the extensibility point;

informing the user that the application program is scheduled to be installed and added to the extensibility point;

sending one or more portions of information regarding the application program that is scheduled to be installed and added to the extensibility point to a remote computer, wherein the remote computer is a trusted entity that is trusted by the user, the remote computer being configured to aggregate application program data from each of the plurality of malware prevention service participants;

receiving from a remote computer aggregated application program information indicating the number of other malware prevention service participants who previously allowed and declined the application to be installed;

displaying to the user the number of malware prevention service participants that allowed installation of the application program and the number of malware prevention service participants that declined installation of the application program;

obtaining decision input from the user regarding whether the application program should be installed, where the user's decision is based upon the received aggregated application information indicating whether other malware prevention service participants allowed or declined installation of the application program; and transmitting a set of data that includes the input obtained from the user to a remote computer, wherein the set of data includes:
a signature of an object that is scheduled to be executed when the application program is added to the extensibility point;
metadata that describes attributes of the object; and
run-time attributes that identify the state of the computer.

2. The method of claim 1, further comprising:
if the input obtained from the user indicates that the application program should not be installed, preventing the application program from being installed on the computer; and
if the input obtained from the user indicates that the application program should be installed, allowing the application program to be installed on the computer.

3. The method claim 1, wherein informing the user that the application program is scheduled to be installed and added to the extensibility point includes generating a signature of an object that will be automatically executed if the application program is added to the extensibility point.

4. The method of claim 3, wherein the object from which the signature is generated is added to the program code from a file.

5. The method of claim 3, further comprising:
comparing the signature to signatures generated from objects that are known to be associated with malware; and
if the signature matches a signature that is known to be associated with malware, informing the user that the application program is malware.

6. The method of claim 1, wherein the signature is generated using a hashing algorithm.

7. The method of claim 1, wherein transmitting a set of data that includes the input obtained from the user includes satisfying requests for additional data; and
wherein the additional data include program code that implements the application program.

8. A computer-implemented method of determining whether an application program is malware, comprising:
employing a processor executing computer executable instructions stored on a computer readable storage medium to implement the following acts:
receiving a set of data at a remote computer system when an application program is scheduled to be installed and added to an extensibility point on a remote computer, the data set being received from a computer system that is monitored for changes to an extensibility point that allows the application program to execute without input from a user, the user being a participant in a malware prevention service that is configured to receive input from a plurality of different malware prevention service participants, the remote computer being a trusted entity that is trusted by the user, the remote computer being configured to aggregate application program data from each of the plurality of malware prevention service participants, wherein the data set includes:
a signature of an object that is scheduled to be executed when the application program is added to the extensibility point;
metadata that describes attributes of the object; and
run-time attributes that identify the state of the computer;
aggregating data that was obtained from a plurality of malware prevention service participants at remote computers including a plurality of indicators regarding whether malware prevention service participants allowed or did not allow the application program to be installed on their respective remote computers; and
performing an analysis of the aggregated data to determine whether the application program is malware, wherein the analysis is based upon the aggregated application data indicating whether other malware prevention service participants allowed or declined installation of the application program.

9. The method of claim 8, further comprising:
generating a signature from the set of data;
if the analysis indicates that the application program is malware, causing the signature to be added to a list of signatures of known malware that is distributed to the plurality of remote computers; and
if the analysis reveals that the application program is benevolent, causing the signature to be added to a list of signatures associated with benevolent application programs that is distributed to the plurality of remote computers.

10. The method of claim 8, wherein aggregating together the data that was obtained from the plurality of remote computers includes using a database application to create a view that identifies the number of users who allowed or did not allow the application program to be installed on their computer(s).

11. The method of claim 8, wherein performing an analysis of the aggregated data to determine whether the application program is malware is performed without reverse engineering program code that implements the application program.

12. The method of claim 8, wherein performing an analysis of the aggregated data to determine whether the application program is malware includes re-creating the run-time attributes of a computer in a laboratory setting and observing the functions performed by the application program.

13. A computer-implemented system for determining whether an application program is malware, comprising:
a processor;
a computer readable storage medium operationally coupled to the processor and storing computer executable instructions, the computer executable instructions, when executed by the processor, implement components comprising:
a reporting module that causes a set of data to be transmitted to the backend server when the application program is scheduled to be added to an extensibility point on the client computer including an indication regarding whether a user of the client computer allowed or did not allow the application program to be installed, the user being a participant in a malware prevention service that is configured to receive input from a plurality of different malware prevention service participants, wherein the set of data includes:
a signature of an object that is scheduled to be executed when the application program is added to the extensibility point;
metadata that describes attributes of the object; and
run-time attributes that identify the state of the computer;
an analysis module that is operative to receive the set of data generated by the reporting module and use the data to determine whether the application program is malware; and
a database application that aggregates the set of data generated by the reporting module together with data previously received from other computers in the computer networking environment whose users are participants of the malware prevention service, the previously received data includes the number of malware prevention service participants who allowed and did not allow the application program to be installed on their computer, wherein the database application is a trusted entity that is trusted by the malware prevention service participants and wherein the determination as to whether the application program is malware is based upon the received aggregated application information indicating whether other malware prevention service participants allowed or declined installation of the application program.

14. The system of claim 13, further comprising a backend database that is operative to store the set of data transmitted to the backend server; and
wherein the database application is further configured to aggregate a view of the data in the backend server that calculates the number of users who allowed or did not allow the application program to be installed on their computer.

15. The system of claim 13, further comprising a signature database operative to store:
 a list of signatures generated from known malware; and
 a list of signatures generated from known benevolent application programs.

16. The system of claim 15, wherein the signature database is updated with signatures generated from application programs that are being installed in the computer networking environment.

17. The system of claim 15, wherein the reporting module is further configured to compare a signature generated from the application program to signatures stored in the signature database.

* * * * *